United States Patent [19]

Hickey

[11] Patent Number: 4,577,530
[45] Date of Patent: Mar. 25, 1986

[54] DIFFERENTIAL CROSS SHAFT RETAINING MEANS

[75] Inventor: John L. Hickey, Fort Wayne, Ind.

[73] Assignee: Dana Corporation, Toledo, Ohio

[21] Appl. No.: 582,395

[22] Filed: Feb. 24, 1984

[51] Int. Cl.⁴ .............................................. F16H 1/40
[52] U.S. Cl. .................................... 74/713; 411/356
[58] Field of Search ................ 74/710, 713, 711; 411/43, 351, 356, 357; 403/318, 378, 379, 155

[56] References Cited

U.S. PATENT DOCUMENTS

| | | | |
|---|---|---|---|
| Re. 21,058 | 4/1939 | Huck | 411/43 X |
| 824,526 | 6/1906 | Coffin | 411/356 X |
| 1,471,915 | 10/1923 | Pagé | 74/713 |
| 1,539,791 | 5/1925 | Hertzler | 411/356 X |
| 1,544,363 | 6/1925 | Alden | 74/713 |
| 1,955,824 | 4/1934 | Mogford et al. | 74/713 |
| 2,192,088 | 2/1940 | Lewis | 74/713 |
| 2,451,035 | 10/1948 | Marsilius | 77/62 |
| 2,558,814 | 7/1951 | Briney | 77/62 |
| 2,563,680 | 8/1951 | Hoffman | 74/713 X |
| 2,701,972 | 2/1955 | Hoffman | 74/713 X |
| 2,808,739 | 10/1957 | Mueller | 74/711 |
| 2,808,740 | 10/1957 | Boden | 74/713 |
| 3,015,970 | 1/1962 | Mueller | 74/711 |
| 3,198,036 | 8/1965 | Müller | 74/607 |
| 3,385,133 | 5/1968 | Terao | 74/713 X |
| 3,653,280 | 4/1972 | Koskela | 74/713 |
| 3,715,936 | 2/1973 | Jones | 74/713 |
| 3,901,103 | 8/1975 | Hufstader | 74/607 X |
| 4,086,826 | 5/1978 | von Kaler | 74/713 |

Primary Examiner—George H. Krizmanich
Assistant Examiner—Dirk Wright
Attorney, Agent, or Firm—Willian Brinks Olds Hofer Gilson & Lione

[57] ABSTRACT

An improved structure for retaining a differential cross shaft in a differential axle assembly is disclosed. The differential axle assembly includes a casing adapted to be rotated about an axis. A cross shaft is disposed within the casing perpendicular to the axis of rotation. A first elongate channel having a larger diameter portion and a smaller diameter portion is formed through the casing. A second elongate channel is formed in the cross shaft having a diameter greater than the smaller diameter portion of the casing channel. The cross shaft channel is adapted to be aligned with the casing channel. A lock pin is inserted through the larger diameter portion of the casing channel and the cross shaft channel into abutting relationship with a shoulder formed at the junction of the larger and smaller diameter portions. A boss is provided to extend into the larger diameter portion of the casing channel to retain the lock pin therein.

9 Claims, 1 Drawing Figure

DIFFERENTIAL CROSS SHAFT RETAINING MEANS

BACKGROUND OF THE INVENTION

The present invention relates in general to differential axle assemblies and in particular to an improved means for retaining a cross shaft within a differential axle assembly.

Differential axle arrangements are widely known in the art and are adapted to permit relative rotation of the driving wheels of a vehicle while still permitting the supply of motive power to both of the wheels. The typical differential axle assembly consists of a ring gear which rotatably drives a spider element supported in a housing. The spider element carries two or more pinion gears on respective trunion portions formed thereon. The pinion gears transmit the power to respective side gears carried by aligned shafts, which shafts are connected to the wheels. The usual differential axle assembly is expensive in construction, even for relatively light duty such as occurs in connection with golf carts, riding lawnmowers, and the like.

SUMMARY OF THE INVENTION

The present invention relates to an improved means for retaining a differential cross shaft in a differential axle assembly. The differential axle assembly includes a casing adapted to be rotated about an axis. A cross shaft is disposed within the casing perpendicular to the axis of rotation. A first elongate channel having a larger diameter portion and a smaller diameter portion is formed through the casing. A second elongate channel is formed in the cross shaft having a diameter greater than the smaller diameter portion of the casing channel. The cross shaft channel is adapted to be aligned with the casing channel. A lock pin is inserted through the larger diameter portion of the casing channel and the cross shaft channel into abutting relationship with a shoulder formed at the junction of the larger and smaller diameter portions. Boss means are provided to extend into the larger diameter portion of the casing channel to retain the lock pin therein.

It is an object of the present invention to provide an improved means for retaining a cross shaft within a differential axle assembly.

Other objects and advantages of the present invention will become apparent to those skilled in the art from the following detailed description of the preferred embodiment, when read in light of the accompanying drawing.

DETAILED DESCRIPTION OF THE PREFERRED EMBODIMENT

Figure 1:
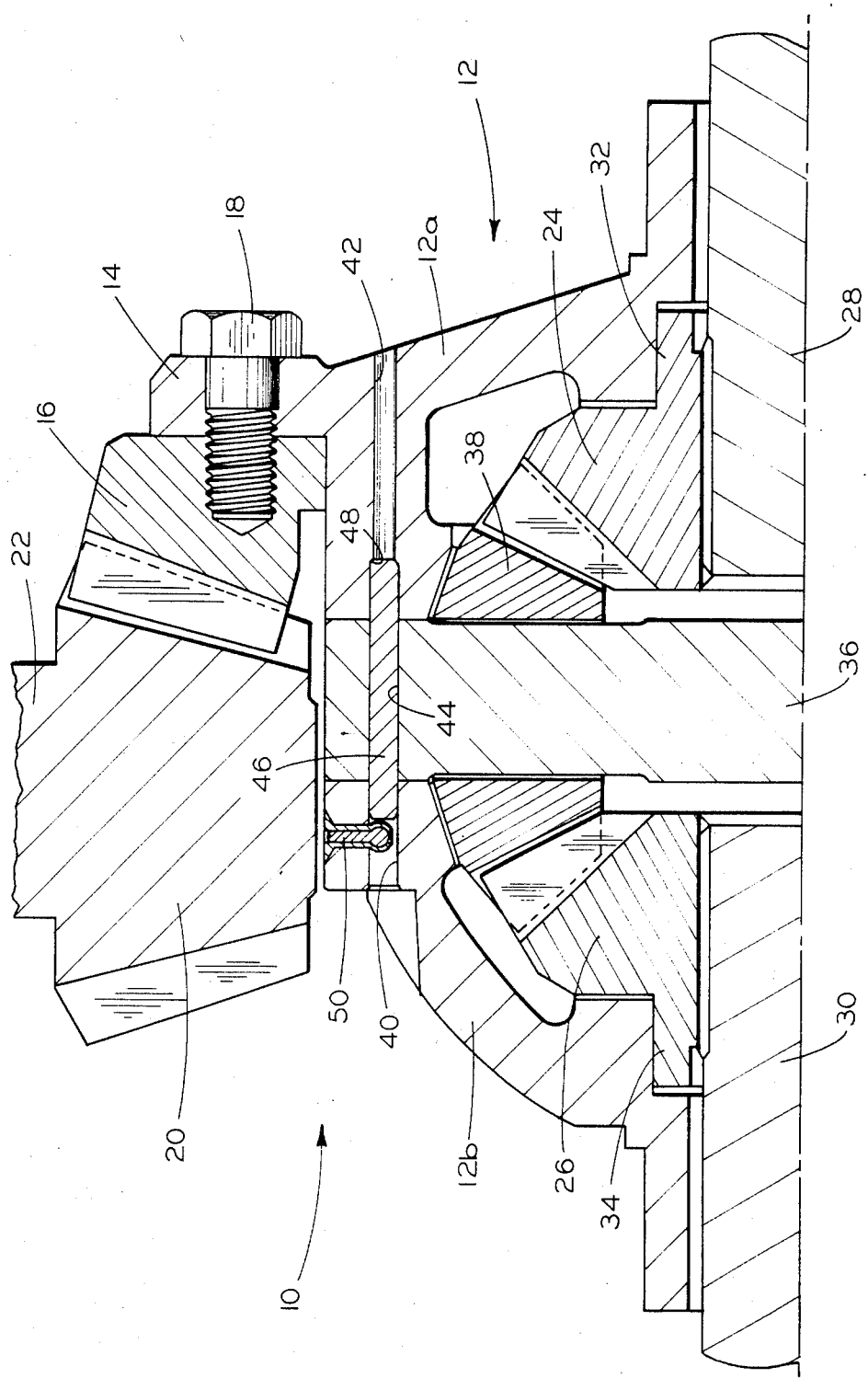
FIG. 1 is an elevational view in half section illustrating a differential axle assembly incorporating an improved means for retaining the cross shaft therein in accordance with the present invention.

Referring now to FIG. 1, there is illustrated a differential axle assembly 10 having a casing 12 rotatably supported within an outer housing (not shown) in a known manner. The casing 12 is formed by joining two opposed side portions 12a and 12b. One side portion 12a is provided with an integral flange portion 14 upon which a ring gear 16 is secured by means of a threaded fastener 18. The ring gear 16 meshes with a bevel gear 20 carried at the end of a drive shaft 22. Rotation of the drive shaft 22 by, for example, a vehicle engine (not shown) causes rotation of the ring gear 16 and the casing 12 about an axis in a known manner.

Side gears 24 and 26 are splined onto the ends of respective drive axles 28 and 30 which extend into the interior of the casing 12. The side gears 24 and 26 are journalled in cylindrical recesses formed in the casing 12 by respective sleeve portions 32 and 34. A cross shaft 36 is supported within diametrically opposed openings (only one is illustrated) formed in the casing 12 perpendicular to the axis of rotation thereof. A pair of pinion gears 38 (only one is illustrated) are rotatably mounted on the cross shaft 36. The pinion gears 38 are adapted to cooperate with the side gears 32 and 34 in a known manner to form the conventional differential axle assembly.

Means are provided for retaining the cross shaft 36 within the differential axle assembly casing 12. In the illustrated embodiment, such means includes a cylindrical channel formed through the casing 12. The channel includes a larger diameter portion 40, which extends completely through one casing side portion 12b and partially through the other casing side portion 12a, and a smaller diameter portion 42, which extends the rest of the way through the other casing side portion 12a. The channel portion 40 is interrupted by the opening in the casing 12 in which one end of the cross shaft 36 is supported. A cylindrical channel 44 is formed through one end of the cross shaft 36. The cross shaft channel 44 preferably has a diameter equal to the larger diameter portion 40 of the casing channel. The cross shaft channel 44 is adapted to be aligned with the larger and smaller diameter portions 40 and 42, respectively, of the casing channel such that a lock pin 46 can be inserted therein through the larger diameter portion 40.

The lock pin 46 is larger in diameter than the smaller diameter portion 42 of the casing channel and typically fits snugly within the larger diameter portion 40 thereof. The lock pin 46 is moved into abutting relationship with a stop means in the form of a shoulder 48 formed at the junction between the larger and smaller diameter portions 40 and 42, respectively, of the casing channel. The lock pin 46 extends through the cross shaft channel 44 into the larger diameter portion 40 of the casing channel. By inserting the lock pin 46 in this manner, the cross shaft 36 is easily and reliably retained within the casing 12 during rotation thereof. Although the lock pin 46 would still be retained if the portion 42 were eliminated, the portion 42 is useful for inserting a tool to force the lock pin 46 from the portion 40 when the cross shaft 36 is to be removed.

To retain the lock pin 46 within the casing channel and prevent axial movement therein, a boss means is provided in the larger diameter portion 40 of the casing channel. In the illustrated embodiment, the boss means consists of a pop rivet 50 which extends through an aperture formed in the casing 12 into the larger diameter portion 40 of the casing channel. In this manner, the larger diameter portion 40 of the casing channel is blocked by the pop rivet 50 such that the lock pin 46 is retained therein between the shoulder 48 and the pop rivet 50 and cannot be removed therefrom unless the pop rivet 50 is first removed. Thus, a simple, inexpensive, and reliable means for retaining the cross shaft lock pin 46 within the differential axle assembly is provided. It will be appreciated that any other boss means can be utilized for blocking the movement of the lock pin 46 within the larger diameter portion 40 of the casing channel.

Although the channels and the lock pin means have been illustrated as being cylindrical in cross-section, any suitable shape could be utilized. The lock pin means would be greater in cross-sectional area than the smaller cross-sectional area portion of the casing channel and equal to or less in cross-sectional area to the larger cross-sectional area portion of the channel.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. In a differential axle assembly having a rotatable casing enclosing side gears cooperating with pinion gears mounted on a cross shaft, the improvement comprising:
   a rotatable casing having a casing channel formed therein;
   a cross shaft supported in openings formed in said rotatable casing and having a cross shaft channel formed therein adapted to be aligned with said casing channel;
   lock pin means disposed in said cross shaft channel and said casing channel for retaining said cross shaft within said casing;
   boss means attached to said casing and extending transversely into said casing channel adapted to retain said lock pin means therein.

2. The invention defined in claim 1 wherein said casing channel is cylindrical and includes a larger diameter portion, a smaller diameter portion, and a shoulder formed therebetween, whereby said lock pin means is retained in said casing channel between said shoulder and said boss means.

3. The invention defined in claim 1 wherein said casing channel includes a larger cross-sectional area portion and a smaller cross-sectional area portion, and said lock pin has a cross-sectional area greater than said smaller cross-sectional area portion of said casing whereby said lock pin means is retained in said casing channel between said boss means and said smaller cross-sectional area portion.

4. The invention defined in claim 1 wherein said casing channel has one end open to an exterior of said casing and another end terminated in a wall of said casing, said channel being interrupted by an opening in the wall of said casing for supporting an end of said cross shaft in which said cross shaft channel is formed.

5. A differential axle assembly comprising:
   a casing adapted to be rotated about an axis, said casing being formed of two opposed side portions and including an elongate casing channel formed therethrough, said casing channel including a larger diameter portion extending through one of said casing side portions and partially through the other of said casing side portions and a smaller diameter portion extending through a remainder of the other of said casing side portions;
   a cross shaft disposed within the casing perpendicular to the axis of rotation of the casing, said cross shaft including an elongate channel formed therein having a diameter greater than the smaller diameter portion of said casing channel and adapted to be aligned with said casing channel;
   lock pin means attached to said casing disposed in said cross shaft channel and the larger diameter portion of said casing channel for retaining said cross shaft within said casing; and
   boss means extending transversely into said larger diameter portion of said casing channel and adapted to retain said lock pin therein.

6. A driving axle structure comprising:
   a casing adapted to be rotatably supported within an outer housing, said casing including a casing channel formed therein having a larger diameter portion, a smaller diameter portion and a shoulder therebetween;
   drive axle means rotatably mounted within said casing;
   side gear means secured to said drive axle means for rotation therewith;
   a cross shaft disposed within said casing and extending between diametrically opposed openings formed in said casing, said cross shaft including a cross shaft channel having a diameter greater than said smaller diameter portion of said casing channel, one of said opposed openings interrupting said larger diameter portion of said casing channel whereby said cross shaft channel is aligned with said casing channel;
   pinion gear means rotatably mounted on said cross shaft and adapted to cooperate with said side gear means;
   lock pin means for retaining said cross shaft within said casing, said lock pin means having a diameter greater than said smaller diameter portion of said casing channel and adapted to abut said shoulder and extend through said cross shaft channel into said larger diameter portion of said casing channel; and
   boss means attached to said casing extending transversely into said larger diameter portion of said casing channel for retaining said lock pin means therein between said boss means and said shoulder.

7. The invention defined in claim 6 wherein said boss means includes a pop rivet extending through an aperture formed in said casing into said larger diameter portion of said casing channel.

8. The invention defined in claim 1 wherein said boss means includes an aperture formed in said casing transversely with respect to said casing channel and a boss retained in said aperture extending into said casing channel.

9. The invention defined in claim 8 wherein said boss consists of a pop rivet.

* * * * *